UNITED STATES PATENT OFFICE 1,970,572

AQUEOUS EMULSION

Harry A. Murray, Jr., New York, N. Y., and Gordon D. Patterson, Wilmington, Del., assignors to E. I. du Pont de Nemours & Company, Wilmington, Del., a corporation of Delaware No Drawing. Application October 16, 1928
Serial No. 312,929

7 Claims. (Cl. 106—37)

This invention relates to the art of emulsions, and more particularly to emulsions of cellulose derivatives of the oil-in-water type.

Various attempts have been made in the past to produce aqueous emulsions which are satisfactory for general use, but prior to the present invention it has not been possible to produce such emulsions having dispersed particles of a predetermined uniform size without subsequent mechanical manipulation. It has also been impossible to produce homogeneous continuous films by flowing or spraying these emulsions.

It is therefore an object of the present invention to provide new methods of making aqueous emulsions.

It is another object of the present invention to provide a method of controlling particle size in aqueous emulsions.

It is a further object of the present invention to provide methods of forcing inversion from water-in-oil type to oil-in-water type emulsions.

It is a still further object of the present invention to provide methods of making continuous films from discontinuous dispersions.

It is also an object of the present invention to provide methods of impregnating various materials.

It is finally an object of the present invention to produce new compositions of matter.

With the above and other objects in view, which will be apparent as the description proceeds, we have set forth our invention in the following specification and have included several examples by way of illustration and not as a limitation.

Example 1

A pyroxylin base is prepared by colloiding 12.5 parts by weight of alcohol-wetted pyroxylin (10 parts of dry ½" pyroxylin) with 20 parts by weight of blown linseed oil in a suitable mixer, such as the Werner and Pfleiderer mixer. 25 parts by weight of a solvent mixture are then added to the colloided mass in portions equalling 5 parts by weight to form a homogeneous base having the following composition:

| | Parts by weight |
|---|---|
| Pyroxylin (½") | 10.0 |
| Alcohol (denatured) | 2.5 |
| Blown linseed oil | 20.0 |
| Butyl acetate | 20.0 |
| Butyl lactate | 5.0 |
| | 57.5 |

An emulsion is prepared by heating .5 part by weight of sodium oleate with 15 parts by weight of gasoline to a clear gel; after which 2 parts by weight of water are added to the hot gel with vigorous stirring, thus forming a concentrated emulsion of gasoline in water that is stabilized by sodium oleate. For convenience this will hereafter be called the agent emulsion.

The presolution or solvating of the sodium oleate in gasoline or some similar liquid is desirable to assure uniform distribution.

17.5 parts by weight of the agent emulsion are then stirred vigorously into 57.5 parts by weight of the pyroxylin base with a high speed stirrer of the propeller blade type.

Inversion of the emulsion from the water-in-oil type to the oil-in-water type may be effected in various ways, as explained below, but in this example it is effected by the sudden addition of water in relatively large quantities, the time of addition being the controlling factor in particle size, as indicated by systems a, b, and c.

System (a): 20 parts by weight of water are added in small portions with vigorous stirring, thus yielding a viscous water-in-oil type dispersion. 10 parts by weight of water are then added with vigorous stirring to invert the system to the oil-in-water type. 68 parts by weight of water are added next, either slowly or rapidly, with more moderate stirring. Microscopic measurements of particle size average 1.19 microns, and the dispersion spontaneously wets an absorbent type of paper.

System (b): 35 parts by weight of water are added in small portions with vigorous stirring, yielding a viscous water-in-oil type dispersion. 10 parts by weight of water are then added with vigorous stirring to invert the system to the oil-in-water type. 53 parts by weight of water are next added, either slowly or rapidly, with more moderate stirring. The average particle size is 1.92 microns, and the dispersion does not wet paper spontaneously. Vacuum filtration is required in order to effect paper penetration, and some separation of disperse phase occurs on the surface of the paper.

System (c): 90 parts by weight of water are added in small portions with vigorous stirring, yielding a viscous water-in-oil type dispersion. 8 parts by weight of water are then added with vigorous stirring to invert the system to the oil-in-water type. The average particle size is 2.23 microns. Severe separation of the disperse phase occurs on the surface of the paper during vacuum filtration, and the dispersion is not adapted to paper impregnation.

The composition of the dispersion in each of the above cases is as follows:

| | Parts by weight |
|---|---|
| Pyroxylin | 10.0 |
| Alcohol | 2.5 |
| Blown linseed oil | 20.0 |
| Butyl acetate | 20.0 |
| Butyl lactate | 5.0 |
| Gasoline | 15.0 |
| Sodium oleate | 0.5 |
| Water | 100.0 |
| | 173.0 |

*Example 2*

17.1 parts by weight of alcohol-wetted pyroxylin (5 second) are colloided with 20 parts by weight of blown castor oil in a suitable mixer. 30 parts by weight of ethyl acetate are mixed with 10 parts by weight of butyl acetate and these are added to the colloidal mass in portions equalling 5 parts by weight, 5 parts by weight of gasoline being added with the last 5 part portion of the acetate mixture. This forms a homogeneous base having the following composition:

| | Parts by weight |
|---|---|
| Pyroxylin (5") | 10.0 |
| Alcohol | 7.1 |
| Blown castor oil | 20.0 |
| Ethyl acetate | 30.0 |
| Butyl acetate | 10.0 |
| Gasoline | 5.0 |
| | 82.1 |

An agent emulsion is prepared as indicated in Example 1, and 1.75 parts by weight of the emulsion are stirred vigorously into 8.21 parts by weight of the base with a high speed stirrer of the propeller blade type. 1.5 parts by weight of water, saturated with ethyl acetate, are added in small portions with vigorous stirring, forming a viscous water-in-oil type dispersion. 1 part by weight of water, saturated with ethyl acetate, is then added with vigorous stirring and this inverts the system to the oil-in-water type. 4.8 parts by weight of water, saturated with ethyl acetate, are then added slowly or rapidly with more moderate stirring, yielding a product which we call a "unit dispersion".

The desired aqueous emulsion is then prepared by vigorously stirring the remainder of the agent emulsion (15.75 parts by weight) into the remainder of the base (73.89 parts by weight), and 13.5 parts by weight of water, saturated with ethyl acetate, are added in small portions with vigorous stirring to form a viscous water-in-oil type dispersion. The unit dispersion is then added rapidly, with vigorous stirring, thus inverting the whole to the oil-in-water type, whereupon 77.2 parts by weight of water, saturated with ethyl acetate, are added either slowly or rapidly with more moderate stirring.

The composition of the resulting dispersion is as follows:

| | Parts by weight |
|---|---|
| Pyroxylin (5") | 10.0 |
| Alcohol | 7.1 |
| Blown castor oil | 20.0 |
| Ethyl acetate | 39.0 |
| Butyl acetate | 10.0 |
| Gasoline | 20.0 |
| Sodium oleate | 0.5 |
| Water | 100.0 |
| | 206.7 |

*Example 3*

10 parts by weight of ½ second viscosity pyroxylin is colloided with 20 parts by weight of blown linseed oil and this is then mixed with 25 parts by weight of butyl acetate, giving a base having the following composition:

| | Parts by weight |
|---|---|
| Pyroxylin (½") | 10.0 |
| Blown linseed oil | 20.0 |
| Butyl acetate | 25.0 |
| | 55.0 |

17.5 parts by weight of an agent emulsion, prepared as indicated in Example 1, are then added to the base, accompanied by moderate stirring with a stirrer of the propeller blade type. 25 parts by weight of water are added in small portions with moderate stirring to form a viscous water-in-oil type dispersion. This is then subjected to sudden vigorous agitation to invert the system to the oil-in-water type, whereupon 73 parts by weight of water are added either rapidly or slowly. The composition of the resulting dispersion is as follows:

| | Parts by weight |
|---|---|
| Pyroxylin (½") | 10.0 |
| Blown linseed oil | 20.0 |
| Butyl acetate | 25.0 |
| Gasoline | 15.0 |
| Sodium oleate | 0.5 |
| Water | 100.0 |
| | 170.5 |

The use of this method is especially useful with systems in which the film forming constituents can be made up to a ready working consistency with a suitable solvent system.

*Example 4*

A base is prepared by colloiding 15 parts by weight of celluloid scrap with 75 parts by weight of ethyl acetate, which is then mixed with 10 parts by weight of butyl acetate to form the following composition:

| | Parts by weight |
|---|---|
| Celluloid scrap | 15.0 |
| Ethyl acetate | 75.0 |
| Butyl lactate | 10.0 |
| | 100.0 |

.5 part by weight of sodium oleate is then heated with 15 parts by weight of gasoline to form a clear gel, and one-half of this gel is added to the base accompanied by vigorous stirring.

25 parts by weight of water, saturated with ethyl acetate, are then added in small portions, with vigorous stirring, to produce a viscous water-in-oil type dispersion. The remainder of the gel is added with vigorous stirring, thus inverting the system to the oil-in-water type by the method which is hereinafter referred to as the addition of the emulsifying agent in solvated form. 75 parts by weight of water, saturated with ethyl acetate, are then added either slowly or rapidly, accompanied by moderate stirring. The composition of the resulting dispersion is as follows:

| | Parts by weight |
|---|---|
| Pyroxylin | 10.0 |
| Camphor | 5.0 |
| Ethyl acetate | 84.0 |
| Butyl lactate | 10.0 |
| Sodium oleate | 0.5 |
| Gasoline | 15.0 |
| Water | 100.0 |
| | 224.5 |

*Example 5*

17.1 parts by weight of alcohol-wetted pyroxylin (5 second) are colloided with 20 parts by weight by blown castor oil, whereupon the whole is mixed with a solvent mixture containing 150 parts by weight of ethyl acetate, 40 parts by weight of butyl acetate and 15 parts by weight of butyl lactate to form a base of the following composition:

| | Parts by weight |
|---|---|
| Pyroxylin (5″) | 10.0 |
| Alcohol | 7.1 |
| Blown castor oil | 20.0 |
| Ethyl acetate | 150.0 |
| Butyl acetate | 40.0 |
| Butyl lactate | 15.0 |
| | 242.1 |

17.5 parts by weight of agent emulsion, prepared as indicated in Example 1, is vigorously stirred into 242.1 parts by weight of the base, into which 85 parts by weight of gasoline have been stirred with a high speed stirrer of the propeller blade type. 300 parts by weight of water, saturated with ethyl acetate, are then added in small portions, with vigorous stirring, yielding a water-in-oil type dispersion. 150 parts by weight of water, saturated with ethyl acetate, are added with vigorous stirring, to invert the system to the oil-in-water type. 48 parts by weight of water, saturated with ethyl acetate, are then added with moderate stirring. The composition of the resulting dispersion is as follows:

| | Parts by weight |
|---|---|
| Pyroxylin (5″) | 10.0 |
| Alcohol | 7.1 |
| Blown castor oil | 20.0 |
| Ethyl acetate | 195.0 |
| Butyl acetate | 40.0 |
| Butyl lactate | 15.0 |
| Sodium oleate | 0.5 |
| Gasoline | 100.0 |
| Water | 500.0 |
| | 887.6 |

*Example 6*

A base is prepared by colloiding 12.5 parts by weight of alcohol-wetted pyroxylin (½ second) with 20 parts by weight of blown linseed oil, which is then mixed with 25 parts by weight of butyl acetate to form the following composition:

| | Parts by weight |
|---|---|
| Pyroxylin (½″) | 10.0 |
| Alcohol | 2.5 |
| Blown linseed oil | 20.0 |
| Butyl acetate | 25.0 |
| | 57.5 |

An agent emulsion is then prepared by heating 1 part by weight of sodium oleate with 15 parts by weight of gasoline to form a clear gel, after which 2 parts by weight of water are added to the hot gel with vigorous stirring.

18 parts by weight of the agent emulsion are then stirred vigorously into the base with a high speed stirrer of the propeller blade type, after which water is added in small portions with vigorous stirring until a natural inversion from the water-in-oil type to the oil-in-water type occurs spontaneously, which is at a water concentration of 27.5 parts by weight. 21.5 parts by weight of water are then added rapidly with moderate stirring. The composition of the resulting dispersion is as follows:

| | Parts by weight |
|---|---|
| Pyroxylin (½″) | 10.0 |
| Alcohol | 2.5 |
| Blown linseed oil | 20.0 |
| Butyl acetate | 25.0 |
| Gasoline | 15.0 |
| Sodium oleate | 1.0 |
| Water | 50.0 |
| | 123.5 |

In this example the solids content is higher than in Examples 1–5, thus permitting the formation of a thicker or high build film.

*Example 7*

A base is prepared by colloiding 12.5 parts by weight of alcohol-wetted pyroxylin (½ second) with 20 parts by weight of blown castor oil, and this is then mixed with 25 parts by weight of butyl acetate and 5 parts by weight of butyl lactate to form the following composition:

| | Parts by weight |
|---|---|
| Pyroxylin (½″) | 10.0 |
| Alcohol | 2.5 |
| Blown castor oil | 20.0 |
| Butyl acetate | 25.0 |
| Butyl lactate | 5.0 |
| | 62.5 |

17.5 parts by weight of agent emulsion, prepared as indicated in Example 1, is then stirred vigorously into the base with a high speed stirrer of the propeller blade type. 25 parts by weight of water are then added in small portions with vigorous stirring, yielding a viscous water-in-oil type dispersion. Inversion is accomplished by the rapid addition of 5 parts by weight of water with vigorous stirring. 18 parts by weight of water are then added with moderate stirring to produce the desired water concentration.

The composition of the resulting dispersion is as follows:

| | Parts by weight |
|---|---|
| Pyroxylin (½″) | 10.0 |
| Alcohol | 2.5 |
| Blown castor oil | 20.0 |
| Butyl acetate | 25.0 |
| Butyl lactate | 5.0 |
| Gasoline | 15.0 |
| Sodium oleate | 0.5 |
| Water | 50.0 |
| | 128.0 |

In this example the solids content is higher than in Examples 1–5, thus permitting the formation of a thicker or high build film.

Any water insoluble pigments may be used with emulsions prepared as indicated above, but we have found it desirable to disperse the pigment in the film forming vehicle or a portion thereof before its incorporation into the emulsion. The following is a specific example of a method of preparing pigmented emulsions, which we have found to be practicable:

Example 8

A base is prepared by colloiding 13.3 parts by weight of alcohol-wetted pyroxylin (½ second) with 5 parts by weight of blown linseed oil, and this is then mixed with 27.1 parts by weight of butyl acetate, 5.4 parts by weight of butyl lactate, and 1 part by weight of dibutyl phthalate. A solution of 8 parts by weight of damar gum in 5 parts by weight of toluol is then added to the previous mixture. 12.5 parts by weight of water are then added in small portions with vigorous stirring, forming a water-in-oil emulsion. 12.5 parts by weight of water are then suddenly added, causing inversion to the oil-in-water type emulsion, to form a base of the following composition:

| | Parts by weight |
|---|---|
| Pyroxylin (½") | 10.0 |
| Alcohol | 3.3 |
| Blown linseed oil | 5.0 |
| Butyl acetate | 27.1 |
| Butyl lactate | 5.4 |
| Dibutyl phthalate | 1.0 |
| Damar gum | 8.0 |
| Toluol | 5.0 |
| Water | 25.0 |
| | 89.8 |

A clear gel is then prepared by heating .5 part by weight of sodium oleate with 7.5 parts of gasoline. 21.8 parts by weight of chrome orange and 10 parts by weight of blown linseed oil are then added to the clear gel and the whole is ground for 15 hours in a ball mill. 100 parts by weight of water are then added in small portions with vigorous stirring, yielding a smooth rather thick agent emulsion of the water-in-oil type.

This agent emulsion is then added in small portions to the first mentioned or base emulsion, accompanied by vigorous stirring with a high speed stirrer of the propeller blade type. This normally forms the desired oil-in-water dispersion of the entire mass, but if there is a tendency for the system to revert to the water-in-oil dispersion this can be easily counteracted by adding a small additional amount of an agent emulsion prepared as indicated in Example 1. 50 parts of water are then added with moderate stirring to produce the desired water concentration. The composition of the resulting pigmented dispersion is as follows:

| | Parts by weight |
|---|---|
| Pyroxylin (½") | 10.0 |
| Alcohol | 3.3 |
| Blown linseed oil | 15.0 |
| Butyl acetate | 27.1 |
| Butyl lactate | 5.4 |
| Dibutyl phthalate | 1.0 |
| Damar gum | 8.0 |
| Toluol | 5.0 |
| Gasoline | 7.5 |
| Sodium oleate | 0.5 |
| Water | 175.0 |
| Chrome orange | 21.8 |
| | 279.6 |

In disperse systems of the type set forth herein the nitrocellulose plastic or other cellulose derivative, which is the inside phase of the emulsion, is in the form of minute globules separated from the outer phase, water, by an extremely thin film of emulsifying agent. Using a properly adjusted formula, smooth, clear and continuous films can be laid down from such systems in spite of the discontinuous character of the dispersions. After the layer of liquid dispersion is spread on the surface which is to be coated, the water evaporates and the globules of nitrocellulose plus solvent blend together with simultaneous absorption of the emulsifying agent, this blending being effected by the attraction which the gasoline or equivalent materials exert on the sodium oleate or other emulsifying agent to attract it toward the cellulose derivative globule.

The water content of the emulsions can be varied over a considerable range, e. g. using at least 25 parts of water per 10 parts of nitrocellulose.

The equilibrium consistency of these emulsions, which is usually reached within eight hours after their preparation, approaches that of water, the outside phase. Unless proper precautions are taken, the freshly prepared emulsion may be of rather stiff consistency due to the presence of air globules which have been introduced during the agitation process. This difficulty may be avoided, however, by so designing the emulsification equipment as to minimize the introduction of air into the emulsion, but if air is introduced it can be eliminated by merely allowing the emulsion to stand. Emulsions may be applied to non-absorbent or absorbent surfaces by flowing or spraying, and in some cases brushing. Impregnation may be accomplished by immersion of the object in the emulsion or by drawing or forcing the emulsion thru the substance to be impregnated, and emulsions prepared according to our process are not rendered unstable by being forced thru paper.

In coating compositions it is desirable, for economic reasons, to maintain the lowest concentration of active solvent in a nitrocellulose solution which will afford a working consistency at which the composition can be brushed, flowed, sprayed, or otherwise applied. In some cases very low consistency is necessary and as a result the solvent cost is high, but use of the aqueous emulsions herein described gives low consistency with a comparatively small amount of solvent.

For certain other applications, particularly impregation purposes, the solutions which are to be applied must have the properties of low viscosity and maximum wetting of the material to which they are being applied, the two properties combining to insure maximum penetration. Ordinary solutions of nitrocellulose and like products in their usual solvents are subject to two criticisms from this standpoint: (1) large amounts of expensive active solvent are required to produce low viscosity and (2) penetration is not rapid or uniform.

Water readily penetrates most absorbent materials, for examples paper, and we have found that aqueous emulsions have the same property providing the size of the globules in the emulsion is adjusted to permit passage of the particles through the interstices between the fibres or other wall structure. If globule size is too large, filtering out takes place and the surface of the paper sheet is coated without affecting the interior fibres. Once having accomplished penetration of the emulsion globules into the interior of the paper structure, it is essential that the globules blend together to form a continuous coating over the fibres, protecting them and knitting them together. This is important in order to develop the greatest strength and water resistance in the fibres. Binding of fibre to fibre at the point where fibre crosses fibre is important if the maximum strength and resistance to tear are to be developed.

For most purposes it is not necessary nor desirable to completely fill the interstices between the fibres with impregnating material, as this reduces the ultimate pliability and flexibility of the impregnated paper to that of a thick film of the impregnating agent. Use of our especially prepared emulsions in impregnation permits attaining the optimum of fibre coating without filling the interstices. The globules retained in contact with the fibres coalesce as the water and solvents evaporate, with the result that a continuous layer of nitrocelluse-softening agent is laid down about each of the fibres and the whole structure is simultaneously cemented together at the points where the fibres cross.

Thus it is evident that the primary characteristics of the aqueous nitrocellulose emulsions described, namely, low viscosity, penetration, formation of continuous film coatings, and low solvent content are all highly important properties to be included in an impregnation composition.

As indicated above preparation of emulsions particularly suited for impregnation purposes depends primarily upon: (1) control of globule size in the emulsion and (2) formation of films from emulsion globules.

Control of globule size, as we exercise it, as a function of the amount of water present in the emulsion at the time of inversion from the water-in-oil type first formed to the oil-in-water type later produced. By decreasing the amount of water present the size of the globules or particles is decreased, and by increasing the amount of water present the size of the particles is increased. The average particle size corresponding to a given water content at the inversion point cannot be stated in general, as it varies with the constituents used, but the concentration producing the desired size can be determined for a given system and the composition reproduced thereafter by adherence to the selected condition.

All of the examples set forth above relate to compositions which are suitable for forming continuous films, and they are also suitable for impregnation purposes providing the particle size obtained bears the proper relation to the size of the interstices in the material to be impregnated, the particle size being controllable in the manner pointed out above.

Inversion at the predetermined water concentration may be accomplished by application at the proper point of the following methods:

a. Sudden, vigorous agitation.
b. Sudden addition of water in relatively large quantities.
c. Addition of the emulsifying agent in its natural or solvated form.
d. Addition of a previously prepared aqueous dispersion of somewhat similar composition.

These means of inversion may be used separately or in any desired combination according to the conditions under which the inversion is desired, but the addition of the emulsifying agent in solvated form to force inversion, as indicated by method c, should not be confused with the use of a solvated material in the preparation of the emulsions themselves previous to the point of inversion.

Formation of a homogeneous continuous film depends primarily upon:

(a) Use of an emulsifying or protective agent which will blend uniformly into the film when the globules coalesce to form the film, the emulsifying agent being present in the emulsion as a thin film at the interface between the globule of pyroxylin plastic and the water.

(b) Use of sufficient slowly evaporating solvent to prevent precipitation of nitrocellulose or other film constituents by water, the necessary amount and character of such solvents varying with the amount of water in the emulsion.

(c) The presence in the nitrocellulose plastic of a solvent for the emulsifying agent which will enable the incorporating effect noted under (a).

Although the examples given above are all limited to the use of pyroxylin or cellulose nitrate it is to be understood that other cellulose derivatives, such as cellulose acetate and ethyl cellulose, may be used in place of the cellulose nitrate.

Various grades of nitrocellulose or other cellulose derivatives varying in viscosity from the lowest to the highest limits can be used together with other relatively water-insoluble constituents, such as castor oil, linseed oil, any natural or artificial resins compatible with the cellulose derivative used, dibutyl phthalate, tricresyl phosphate, ethyl acetate, butyl acetate, and other solvents or softeners.

Although we have referred to alcohol-wetted pyroxylin in most of the above examples, we desire to have it understood that pyroxylin not so wetted is equally useful, but the alcohol-wetted pyroxylin is used because this is the form in which it is most easily obtainable commercially.

This invention is applicable to the impregnation of a wide range of porous materials, including paper, felt, textile materials, leather, wood and composition wall boards.

By the term "solvated", as used herein, we mean that the substance is in true or colloidal solution or swelled to the form of a gel.

By the term "blend", as used herein, we mean the uniting of adjacent globules by the aid of the gasoline or equivalent material which overcomes the tension that tends to maintain the globular form and attracts the soap or equivalent material toward the cellulose derivative globule as the water and solvents evaporate, independently of any external mechanical action.

From the above description and examples it will be apparent that we have developed new methods of making aqueous emulsions, methods of forcing inversion from water-in-oil to oil-in-water dispersion at any desired time, a method of controlling particle size, methods of producing continuous films from aqueous dispersions, methods of impregnating, and new emulsions per se.

As many apparently widely different embodiments of this invention may be made without departing from the spirit and scope thereof, it is to be understood that we do not limit ourselves to the specific embodiments thereof except as defined in the appended patent claims.

We claim:

1. The method of making aqueous emulsions which comprises colloiding a cellulose derivative with oil, and adding a solvent thereto to form a base material; heating a solvating liquid and an emulsifying and stabilizing material to form a clear gel, and adding water thereto with vigorous stirring to form an emulsion of the solvating liquid and water; adding the emulsion to the base material with rapid stirring, and adding water to the mixture with vigorous stirring to invert the mixture to an oil-in-water dispersion.

2. The method of claim 1, in which the cellulose derivative is pyroxylin and in which the solvating liquid is gasoline.

3. The method of preparing a film-forming material which comprises colloiding a cellulose derivative with oil, adding a solvent thereto, mixing this with an emulsion comprising a blending agent, and inverting the mixture to an oil-in-water dispersion.

4. The method of making aqueous emulsions which comprises forming a base material including a cellulose derivative, an oil, and a solvent for the cellulose derivative; heating a solvating liquid and an emulsifying agent to form a clear gel, and adding water thereto with vigorous stirring to form an emulsion of the solvating liquid and water; adding the emulsion to the base material with stirring, and then adding water to the mixture with vigorous stirring to invert the mixture to an oil-in-water dispersion.

5. The method of making aqueous emulsions which comprises forming a base material including cellulose nitrate, a blown vegetable oil, and a solvent for the cellulose nitrate; heating a mixture of gasoline and sodium oleate to form a clear gel, and adding water with vigorous stirring to form an emulsion of the gasoline and water; adding the emulsion to the base material with stirring, and adding water to the mixture with vigorous stirring to invert the mixture to an oil-in-water dispersion.

6. The method of making aqueous emulsions which comprises forming a base material including a cellulose derivative, an oil, and a solvent for the cellulose derivative, adding an emulsion of a solvating liquid in water to the base material with stirring, and then adding water to the mixture with vigorous stirring to invert the mixture to an oil-in-water dispersion.

7. The method of making aqueous emulsions which comprises colloiding a cellulose derivative with a liquid compatible therewith to form a viscous homogeneous mass, incorporating therewith an emulsifying agent, adding water with agitation, to form an emulsion of water in the cellulose derivative solution, and converting to an emulsion of cellulose derivative solution in water.

HARRY A. MURRAY, Jr.
GORDON D. PATTERSON.